(12) United States Patent
Erad et al.

(10) Patent No.: US 10,338,524 B2
(45) Date of Patent: Jul. 2, 2019

(54) APPARATUS AND METHOD FOR PROJECTING CONTENT (71) Applicant: Creativision (I.P.) LTD., Kidron (IL)

(72) Inventors: Yariv Erad, Kidron (IL); Menachem Erad, Ashdod (IL)

(73) Assignee: CREATIVISION (I.P.) LTD, Kidron (IL)

(*) Notice: Subject to any disclaimer, the term of this patent is extended or adjusted under 35 U.S.C. 154(b) by 352 days.

(21) Appl. No.: 15/118,901

(22) PCT Filed: Feb. 12, 2015

(86) PCT No.: PCT/IL2015/050163
§ 371 (c)(1),
(2) Date: Aug. 15, 2016

(87) PCT Pub. No.: WO2015/125133
PCT Pub. Date: Aug. 27, 2015

(65) Prior Publication Data
US 2017/0322514 A1 Nov. 9, 2017

Related U.S. Application Data (60) Provisional application No. 61/940,864, filed on Feb. 18, 2014.

(51) Int. Cl.
G03H 1/00 (2006.01)
G06F 3/01 (2006.01)
A47G 1/06 (2006.01)
G03H 1/22 (2006.01)
G09F 1/12 (2006.01)
G06F 3/03 (2006.01)
G03B 21/00 (2006.01)

(52) U.S. Cl.
CPC .......... *G03H 1/0005* (2013.01); *A47G 1/0622* (2013.01); *G03B 21/00* (2013.01); *G03H 1/22* (2013.01); *G06F 3/011* (2013.01); *G06F 3/03* (2013.01); *G09F 1/12* (2013.01)

(58) Field of Classification Search
CPC ...... G03H 1/0005; G03H 1/22; A47G 1/0622; G03B 21/00; G06F 3/011; G06F 3/03; G09F 1/12
USPC .......................................... 359/15
See application file for complete search history.

(56) References Cited

U.S. PATENT DOCUMENTS

2002/0145704 A1 10/2002 Shirakura
2006/0171008 A1 8/2006 Mintz et al.
2008/0013793 A1 1/2008 Hillis et al.
2011/0232146 A1 9/2011 Lin

*Primary Examiner* — Collin X Beatty
*Assistant Examiner* — Grant A Gagnon
(74) *Attorney, Agent, or Firm* — Soroker Agmon Nordman (57) ABSTRACT The subject matter discloses an electronic device, comprising a frame comprising one or more projecting units, the one or more projecting units are arranged in a manner to project the content on a projecting field, said projecting field is defined by the frame.

29 Claims, 9 Drawing Sheets

APPARATUS AND METHOD FOR PROJECTING CONTENT

FIELD OF THE INVENTION

The invention generally relates to projecting content.

BACKGROUND OF THE INVENTION

Many electronic devices used for the capturing and consumption of content are equipped with a screen which is used to display the content. In some cases—in which such screen is a touch screen—the screen is also used as an input/control/operation/interaction mean for the electronic device.

The use of a screen unit (or a display unit) within an electronic device, has several drawbacks. First, a physical screen unit determines de-facto the size of the device. For example, a tablet with a 10" screen has to be in a defined size, which is determined by the screen size, even if its bezel (or frame) size is significantly smaller.

Current efforts to develop flexible screens can mean that such screens might provide flexible display units, which still require storage for the flex display. Other solutions use projection of the content, instead, or as a complimentary mean, to a display unit. But such projectors require a surface on which this projection will be shown, thus limit the operational functionality of the device.

For example, Apple's patent application US20110197147 describes the integration of projectors into mobile electronic devices. Interaction with the projected content is detected by a camera, which monitors a hand movement or "touch" of the displayed content on a surface.

SUMMARY OF THE INVENTION

It is an object of the subject matter to disclose an electronic device, comprising a frame comprising one or more projecting units, wherein the one or more projecting units are arranged in a manner to project the content on a projecting field, said projecting field is defined by the frame.

In some cases, the electronic device further comprises a reflector for reflecting content projected from the projecting unit toward the projecting field.

In some cases, the frame is of a polygonal shape and comprises two or more frame elements, at least two of the two or more frame elements comprises a projection unit of the two or more projection units. In some cases, at least one frame element is structured of two or more collapsible elements in a telescopic arm. In some cases, least one of the collapsible elements is rotatable versus another collapsible element of the same frame element. In some cases, one frame element of the at least two frame elements comprises more projecting units than another frame element of the at least two frame elements.

In some cases, the electronic device comprising two or more projecting units, wherein one projection unit of the two or more projecting units differs in a display property from another projecting unit of the two or more projecting units.

In some cases, the frame covers less than 360 degrees of the projecting field on which the content is projected. In some cases, the frame is of a two dimensional structure, such that the content can be displayed on a single projecting field. In some cases, the frame is of a three dimensional structure, such that the content can be displayed on two or more projecting fields. In some cases, one projecting field of the two or more projecting fields shows a content different from a second content displayed on a second projecting field of the two or more projecting fields.

In some cases, the electronic device further comprises a connector for connecting between frame elements of the frame, such that the frame is collapsible.

In some cases, the connector is capable of transferring information from one frame element to another. In some cases, the frame comprises a flexible display unit. In some cases, the frame comprises a storage unit. In some cases, the projecting field is variable in depth.

In some cases, the depth is adjusted in response to a predefined event.

In some cases, the electronic device further comprises a sensor for detecting a presence of an object inside or near the projecting field. In some cases, the content displayed on the projecting field interacts with the object detected by the sensor. In some cases, the projecting field receives input from a user according to gestures detected by the sensor on the projecting field. In some cases, the sensor is configured to monitor blood pulse of a user detected in the projecting field. In some cases, the content displayed on the projecting field according to the object detected by the sensor.

In some cases, the electronic device further comprises an input unit on the frame for controlling the operation of the projecting units. In some cases, changing a location of a projecting unit according to a command inputted into the input unit. In some cases, changing orientation or configuration of the frame responsive to the command.

In some cases, the projected content comprises a hologram. In some cases, the location of the hologram inside the projecting field changes over time. In some cases, the electronic device comprises a second hologram. In some cases, the electronic device adjusts a physical property of the frame according to the content displayed in the projecting field. In some cases, the electronic device adjusts a display property of the two or more display creation units according to the content displayed in the projecting field.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

The present invention discloses an electronic device in which the content data is projected in such manner that it does not require a surface to be projected on, and the content is projected onto a projecting field defined within the frame of the device. This invention also describes means to interact with the projected content and means to use the device. The electronic device comprises one or more projecting unit. In addition to the one or more projecting units, the electronic device may also comprise one or more reflectors, such as mirrors or lenses. The reflectors reflect content projected from the projecting units toward the projecting field. When the frame forms a polygonal shape and formed of two or more frame elements, at least some of the frame elements comprise projecting units or reflectors. The frame elements may be made of metal or any other material or combination of materials, may be rigid or semi rigid, as long as the content is projected onto the projecting field. The content may be projected onto a portion of the projecting field, for example a triangle in the center of the projecting field.

Figure 1:
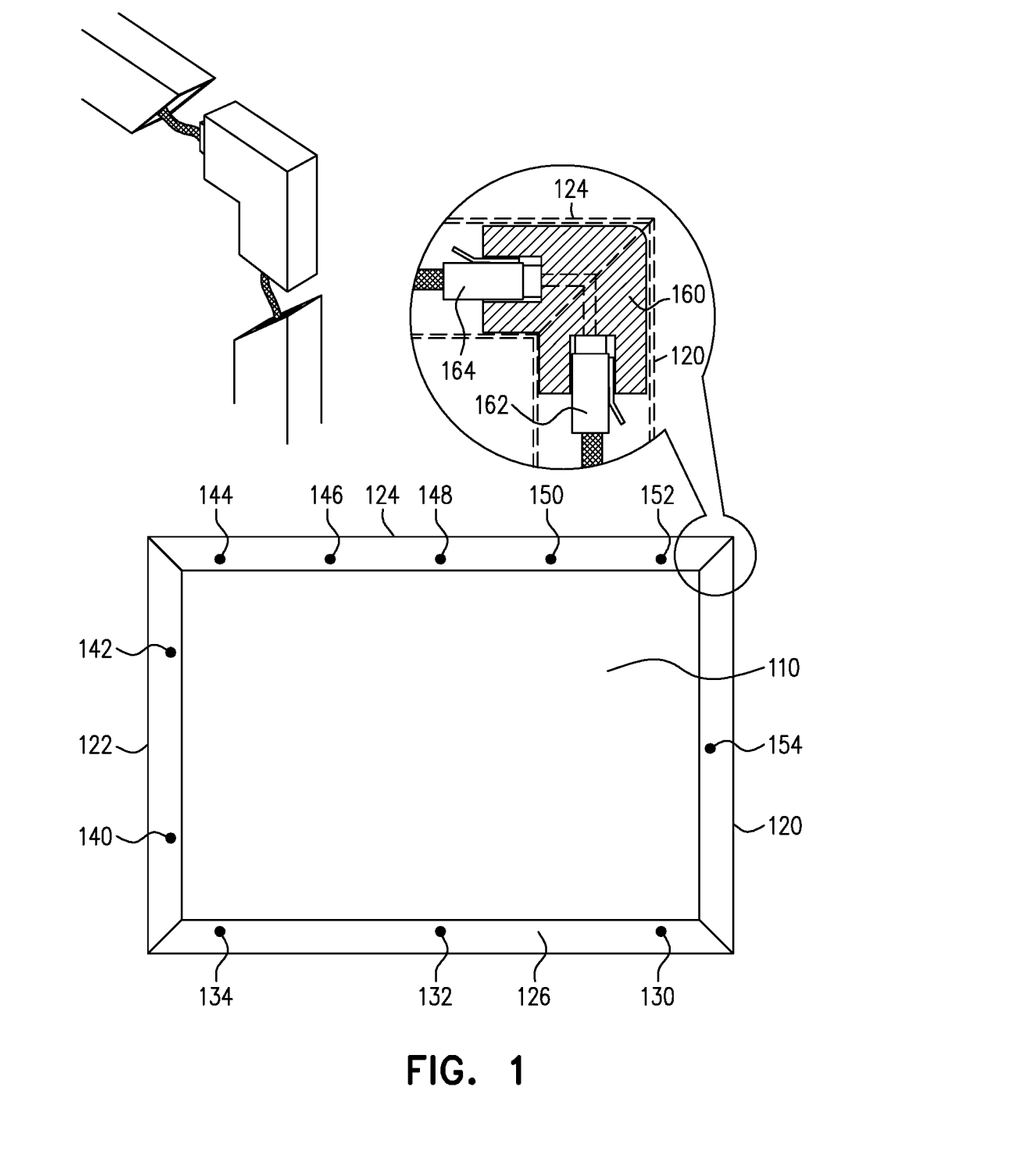
FIG. 1 shows an electronic device comprising a frame with multiple frame elements, each comprises a projection unit, in accordance with a preferred embodiment of the invention.

FIG. 1 shows an electronic device comprising a frame with multiple frame elements, each comprises a projection unit, in accordance with a preferred embodiment of the invention. The frame of the subject matter may be of a polygonal shape, an elliptical shape or a combination thereof. In the exemplary embodiment of FIG. 1, the frame is of a rectangular shape and comprises four (4) frame elements, 120, 122, 124 and 126. At least a portion of the frame elements comprise projection units directed towards a projection field 110 defined as a virtual area between the frame elements 120, 122, 124 and 126, inside the frame. In this exemplary embodiment, frame element 120 comprises projection unit 154, frame element 122 comprises projection units 140 and 142, frame element 124 comprises projection units 144, 146, 148 and frame element 126 comprises projection units 130, 132 and 134. The projection units 154, 140, 142, 144, 146, 148, 130, 132 and 134 are configured to project information or content displayed to a user of the device of the disclosed subject matter. At least some of the projection units are directed to the projection field 110.

The frame may be assembled of a single sheet of material, or of multiple frame elements connected together. In some exemplary cases, the frame elements may be of elliptical shapes, resulting in the frame being designed in a non-polygonal shape. In some cases, the device of the subject matter comprises connectors for connecting two or more frame elements that assemble the frame. For example, connector 160 is used to connect frame elements 120 and 124. Top end 162 of frame element 120 may be inserted into a bottom niche in the connector 160 and right end 164 of frame element 124 may be inserted into a left niche in the connector 160. The connectors may include hinges, bearings, magnets, axis and the like. The connectors may also enable data transfer or transmission between the frame elements and the physical components attached thereto. The connectors may enable the user of the electronic device to change or adjust the shape of the frame, for example from a rectangular shape to a triangular shape.

In some cases, at least some of the projection units of the frame are not directed to the projection field 110 defined inside the frame, but to a second direction. The second direction may be associated with another projection field to which data is projected, as detailed below. The frame elements may be rotatable around the connectors, for example via hinges connecting the frame elements, in order to enable projection of data from the projection units to more than one direction.

The electronic device of the present invention may comprise a processor for controlling the operation of the projection units, for example determining the content projected from the projection units towards the projection field. The electronic device may be equipped with sensors as detailed below.

Figure 2:
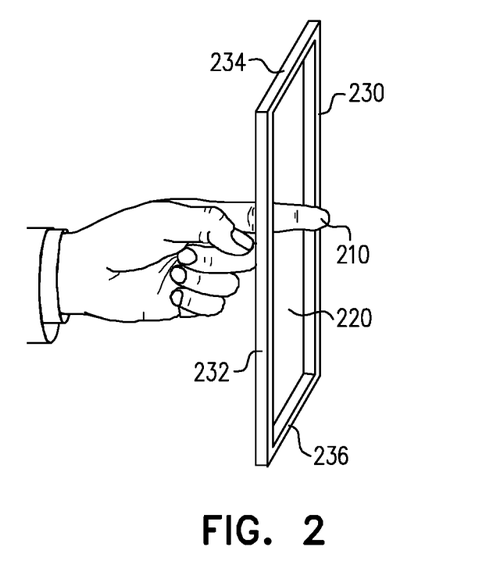
FIG. 2 shows a frame with multiple frame elements and a user's finger inside the projection field, in accordance with a preferred embodiment of the invention.

FIG. 2 shows a frame with multiple frame elements and a user's finger inside the projection field, in accordance with a preferred embodiment of the invention. The projection field 220 is defined as the area inside the frame elements 230, 232, 234 and 236 of the frame. The projection field 220 between the frame elements 230, 232, 234 and 236 may be empty, filled with air, or filled with a predefined material to enhance the content projected by the projection units of the electronic device. Such predefined material may be gas, liquid or solid, and may be contained in a contained placed between the frame elements by a user of the electronic device. A sensing unit of the electronic device detects the presence of the user's finger 210 inside the projection field 220, for example using a camera or a volume sensor. In such a case, the content projected by the projection units onto the projection field 220 may be determined responsive to the presence of the user's finger 210, gestures made by the user's finger 210 and the like. The user's finger 210 is an example of any item inserted into the projection field 220, such as a stylus or a pen. The user's finger 210, stylus or pen may be used by the user of the electronic device to input commands into a menu or input unit projected into the projection field 220.

Figure 3:
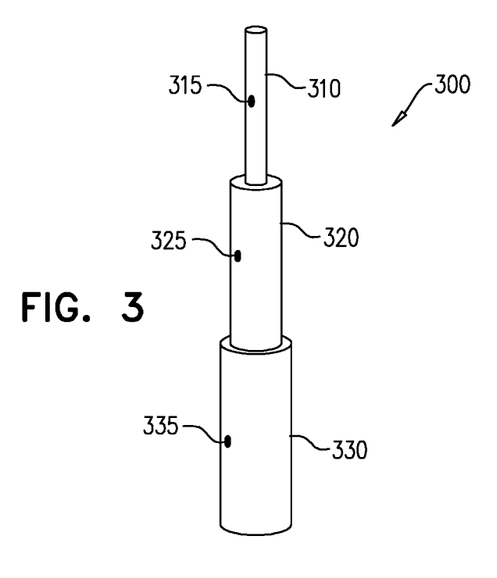
FIG. 3 shows a frame element of the frame assembled of a plurality of modular units, in accordance with a preferred embodiment of the invention.

FIG. 3 shows a frame element of the frame assembled of a plurality of modular units, in accordance with a preferred embodiment of the invention. The modular units 310, 320, 330 may be removable, foldable or detachable from each other in any way, in order to enable a user of the electronic device to adjust the size of the projection field. At least some of the modular units 310, 320, 330 comprise a projection unit, or more than one projection units. For example, modular unit 310 comprise projection unit 315, modular unit 320 comprise projection unit 325 and modular unit 330 comprise projection unit 335. In some cases, the modular units 310, 320, 330 form a frame element of a telescopic arm in which modular unit is inserted into modular unit 320 and modular unit 320 (with modular unit 310) is inserted into modular unit 330. The angle of projection of content from each of the modular units may vary, to enable more options for the user of the electronic device. For example, the control unit may send a command to a physical mechanism inside modular unit 320 to change the projection angle of projection unit 325 from 32 degrees above the horizon to 36 degrees above the horizon.

Figure 4A:
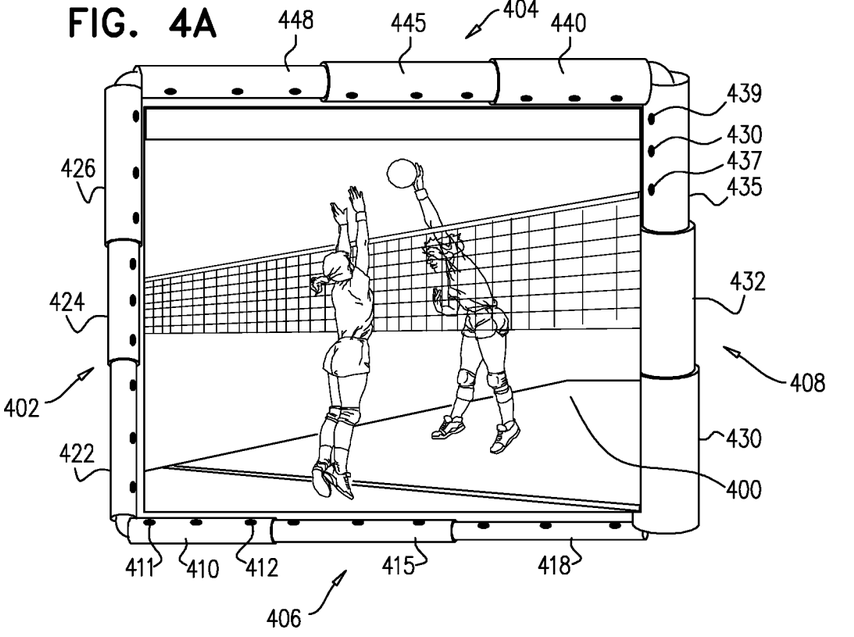
FIG. 4A shows an electronic device with a frame comprising multiple frame elements having modular units, in accordance with a preferred embodiment of the invention.

FIG. 4A shows an electronic device with a frame comprising multiple frame elements having modular units, in accordance with a preferred embodiment of the invention. The frame comprises frame elements 402, 404, 406 and 408, as the projection field 400 is defined there between. The frame elements may be connected by connectors (not shown) to enables quick disassemble of the frame after displaying the content projected into the projection field, when desired by the user of the electronic device. Frame element 402 is assembled of modular units 422, 424 and 426, at least a portion of which comprises one or more projection units directed at the projection field 400 and configured to emit a signal towards the projection field 400. Frame element 404 is assembled of modular units 440, 445 and 448, at least a portion of which comprises one or more projection units directed at the projection field 400 and configured to emit a signal towards the projection field 400.

Frame element 406 is assembled of modular units 410, 415 and 418, at least a portion of which comprises one or more projection units directed at the projection field 400 and configured to emit a signal towards the projection field 400. For example, projection units 411 and 412 are contained in modular unit 410 and directed at projection field 400. Frame element 408 is assembled of modular units 430, 432 and 435, at least a portion of which comprises one or more projection units directed at the projection field 400 and configured to emit a signal towards the projection field 400.

The projection field 400 is created by the two dimensional shape of the frame elements 402, 404, 406 or 408. It should be noted that additional two dimensional arrangements of frame elements may result in two or more projection fields, for example in the case of additional frame elements extending over frame element 440 and creation of a second projection field over frame element 440. The user of the electronic device may physically rotate one of the modular units of the frame elements 402, 404, 406 or 408, to change a property of the content projected onto the projection field, for example level of brightness or change content projection from gray-scale to color. Rotation of some modular units may enable the user to point some of the projecting units of the rotating modular units to another projecting area, in case the frame forms to or more projecting areas. In some cases, the rotated modular unit may be connected to another frame element or to another modular unit via a joint, hinge or another mechanism desired by a person skilled in the art.

Figure 4B:
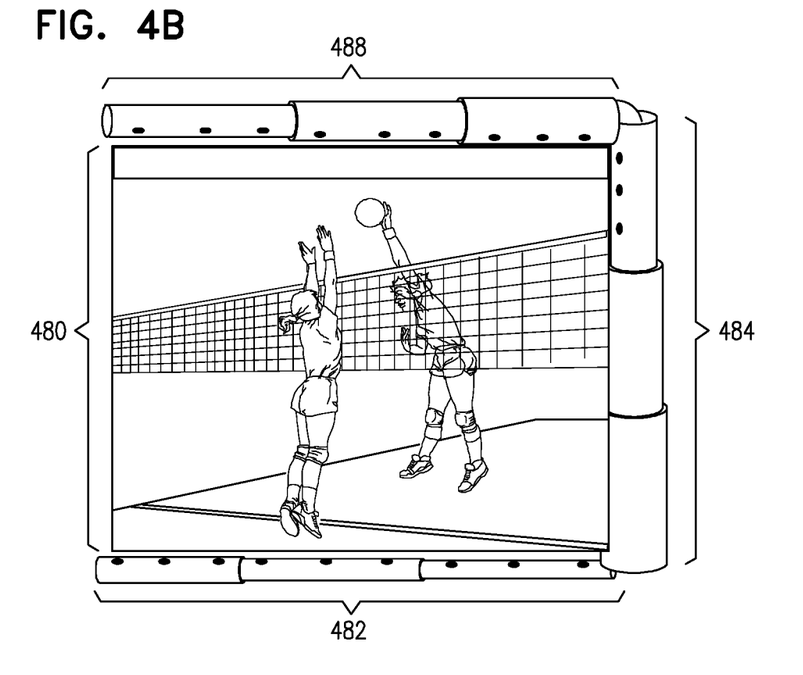
FIG. 4B shows an electronic device with a frame covering a portion of the projection field circumference, in accordance with a preferred embodiment of the invention.

FIG. 4B shows an electronic device with a frame covering a portion of the projection field circumference, in accordance with a preferred embodiment of the invention. The projection field is defined by four ends—upper end 488, right end 484, bottom end 482 and left end 486. The upper end 488, right end 484 and bottom end 482 are bordered by frame elements having projection units, while left end 486 lacks such frame element.

Figure 5:
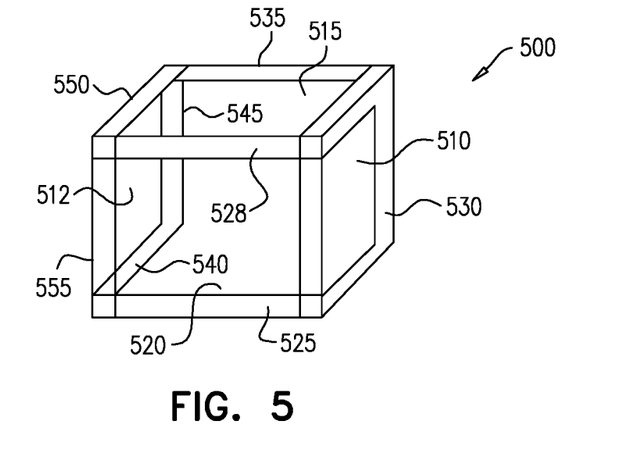
FIG. 5 shows an electronic device with a frame creating multiple projection fields, in accordance with a preferred embodiment of the invention.

FIG. 5 shows an electronic device with a frame creating multiple projection fields, in accordance with a preferred embodiment of the invention. The frame 500 is of a three dimensional shape, having frame elements extending to three dimensions. The three-dimensional shape of the frame 500 enables the creation of two or more projection fields as detailed below. In some exemplary cases, the frame comprises front top frame element 528, front left frame element 555, front bottom frame element 525 and front right frame element 522 that form a front projection field 520. Left projection field 512 is created by left bottom frame element 540, front left frame element 555, top left frame element 550 and bottom left frame element 545. This way, the electronic device of the disclosed subject matter can display content to multiple directions via projection units located at the frame elements of the electronic device. At least some of the frame elements may comprise projection units directed towards two or more directions, such that some projection units project data to a first projection field and some other projection units project data to a second projection field. Rear right frame element 530 may project data to right projection field 510 and rear projection field 515. The content projected to the different projection fields may be the same, or different according to predefined rules or commands from the user of the electronic device.

Figure 6:
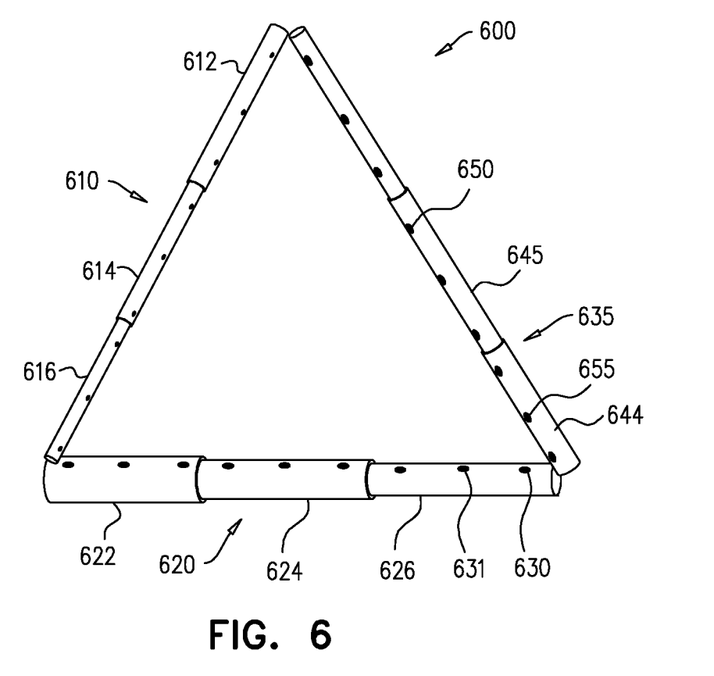
FIG. 6 shows an electronic device with a frame having a triangular shape, in accordance with a preferred embodiment of the invention.

FIG. 6 shows an electronic device with a frame having a triangular shape, in accordance with a preferred embodiment of the invention. The angles between the frame elements may be adjusted by the user of the electronic device. For example, frame element 610 comprising modular units 612, 614 and 616 may be connected to frame element 620 in an angle of 55° and the connection between frame elements 610 and 620 may later adjusted to an angle of 620. Frame element 620 comprises modular units 622, 624 and 626, and modular unit 626 comprises projection units 630 and 631. Frame element 635 comprises modular units 640, 645 and 646. Modular unit 640 comprises projection unit 655, modular unit 645 comprises projection unit 650 and modular unit 646 comprises projection units 660 and 662.

Figure 7:
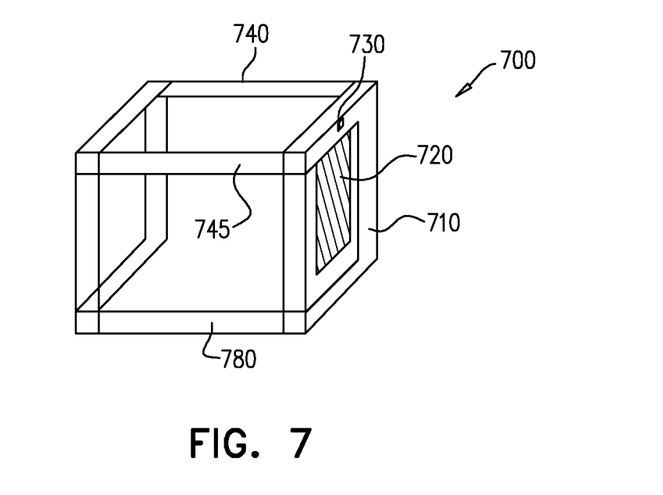
FIG. 7 shows an electronic device with a frame connected to a flexible display device, in accordance with a preferred embodiment of the invention.

FIG. 7 shows an electronic device with a frame connected to a flexible display device, in accordance with a preferred embodiment of the invention. The frame 700 comprises rear top frame element 740, front top frame element 745 front bottom frame element 750, rear right frame element 710 and additional frame elements. A display device 720 may be connected to some frame elements of the frame, for example via connectors. The display device 720 may be made of flexible material. The electronic device may have additional physical components attached to and removable from frame elements of the frame, for example sensors, memory storage 730, cameras, speakers, microphones, relative location units and the like. The connectors may also enable data transfer or transmission between the frame elements and the physical components attached thereto. The flexible display device may be of a transparent or semi-transparent configuration.

Figure 8:
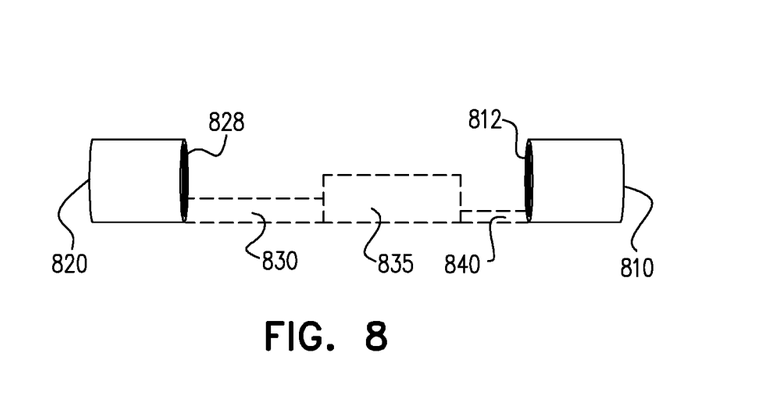
FIG. 8 shows an electronic device with a projection field having multiple depths, in accordance with a preferred embodiment of the invention.

FIG. 8 shows an electronic device with a projection field having multiple depths, in accordance with a preferred embodiment of the invention. The projection field is defined by the frame, as detailed above. The frame comprises frame elements 810, 812 having projection units 812, 822 that project content into the projection field, within the frame. The projection field of this exemplary embodiment is divided into three segments—right segment 840, central segment 835 and left segment 830. The depths of the three segments 830, 835, 840 are different, which means that the protrusion of projection from the frame in each of the segments three segments 830, 835, 840 is different. The depth may be defined by the distance of content projected by the projection units from a virtual surface created inside the frame. In some cases, the depths may vary over time, for example according to predefined rules, responsive to an event or responsive to a command sent or inputted by the user of the electronic device. The predefined event may be influenced by a computerized application operating in or with the electronic device, or content projected on the projection field. The segments may also be adjusted. For example, the right segment 840 may consume 30 percent of the projection field and then consume 40 percent.

Figure 9A:
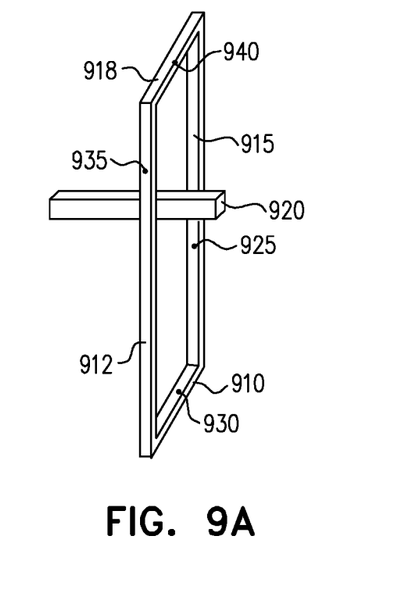
FIG. 9A shows an element inserted by a user into the projection field, in accordance with a preferred embodiment of the invention.

FIG. 9A shows a physical element inserted by a user into the projection field, in accordance with a preferred embodiment of the invention. The physical element 920 inserted into the projection field 900 may be detected and identified by sensors 940, 925, 930 and 935. The sensors may be located on the frame elements 912, 918, 910, 915 of the frame, or may be located near the frame. The sensors may contain a camera, or selected from a group comprising Passive infrared detectors, Ultrasonic detectors, Microwave detectors, Photo-electric beams, Glass break detection, Smoke, heat, and carbon monoxide detectors, Vibration (shaker) or inertia sensors, Passive magnetic field detection, or any sensor desired by a person skilled in the art. The sensors 940, 925, 930 and 935 may identify the physical element 920 or just a property of the physical element, such as size, volume, color, brightness and the like. The information extracted by the sensors 940, 925, 930 and 935 may be sent to a processing unit for further analysis, for example in order to change the content projected by the projection units of the frame elements 912, 918, 910, 915 responsive to the identity or property of the physical element 920. The physical element 920 may be a gaming tool inserted by the user of the electronic device cooperating with the content displayed on the projection field, or during an online game. The processing unit may determine whether or not the object the user brought closer to the projection field conforms to the content projected onto the projection field and provide a grade or any other feedback to the user, for example via the projection field or via a microphone.

Figure 9B:
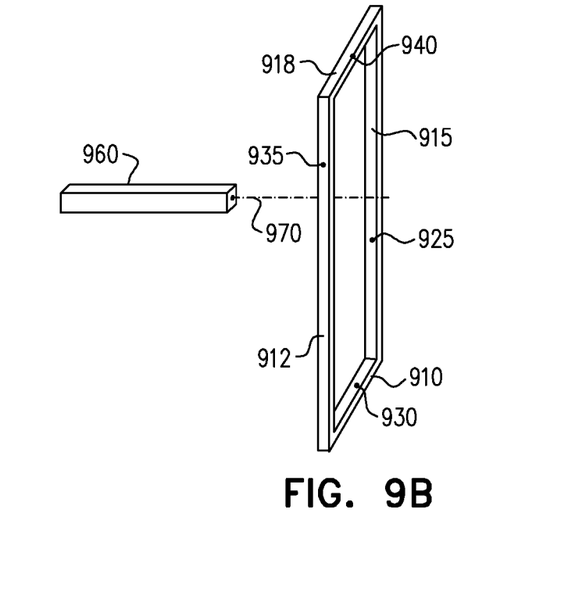
FIG. 9B shows a laser pointer inserted by a user into the projection field, in accordance with a preferred embodiment of the invention.

FIG. 9B shows a laser pointer inserted by a user into the projection field, in accordance with a preferred embodiment of the invention. The laser beam 970 emitted from the laser pointer 960 may be detected by the sensors 940, 925, 930 and 935 disclosed above. The color of light of the laser beam 970 emitted by the laser pointer 960 may change over time or responsive to a command from its user. In some other cases, the element inserted into the projection field transmits a wireless signal detected by wireless receivers mounted on the frame elements or communicating with electronic modules on the frame elements.

Figure 10A:
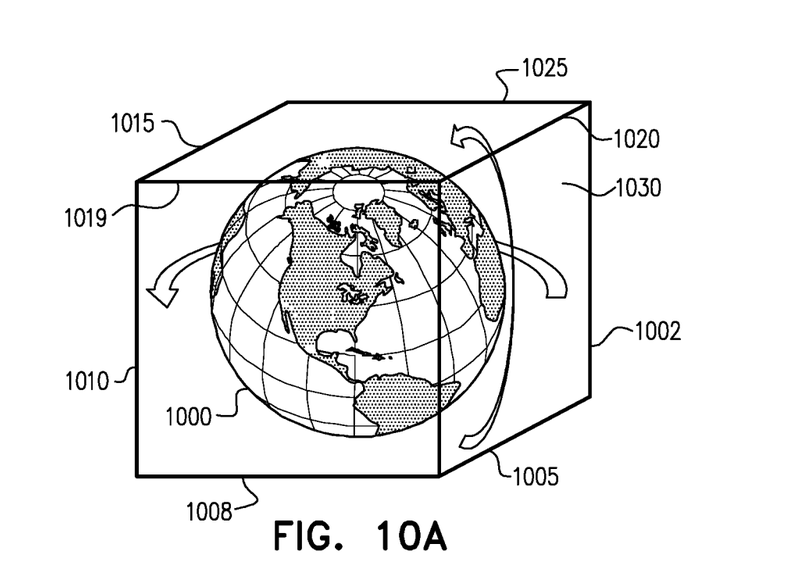
FIGS. 10A-10C show a hologram projected into the projection field, in accordance with a preferred embodiment of the invention; and, FIG. 11 shows building blocks of the electronic device, in accordance with a preferred embodiment of the invention.
Figure 10B:
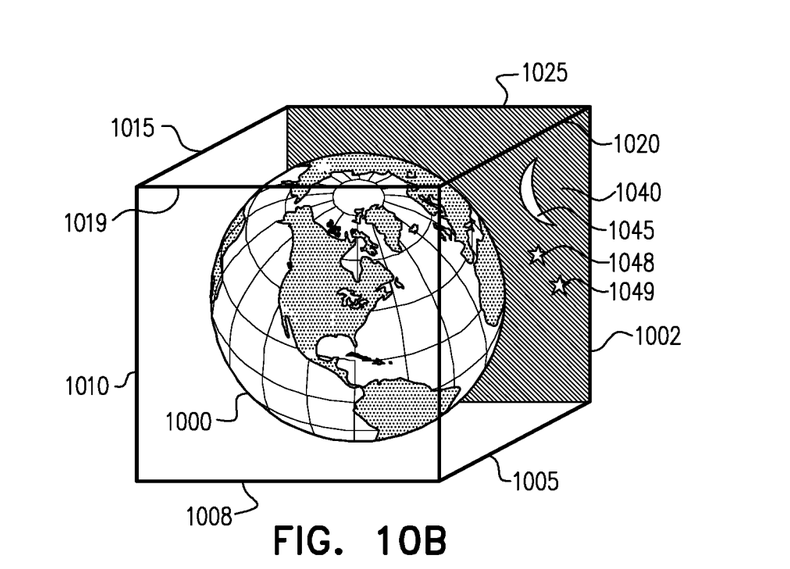
Figure 10C:
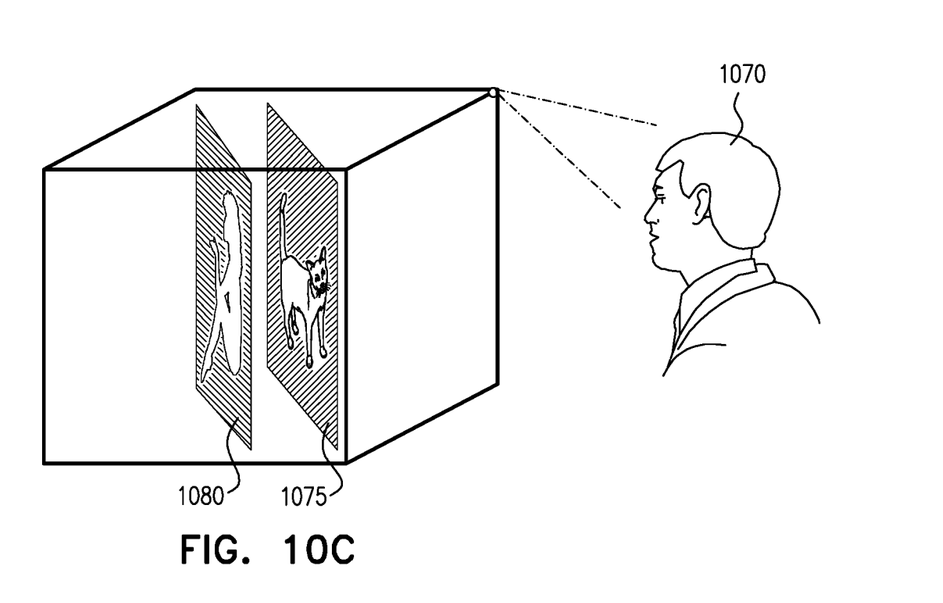

FIGS. 10A-10C show a hologram projected into the projection field, in accordance with a preferred embodiment of the invention. FIG. 10A shows a frame defining a projection field containing a hologram 1000. The frame is a three dimensional frame, comprising two or more projection fields, such as rear projection field 1030 defined between frame elements 1025, 1002 and two more frame elements. The hologram may be viewed via all or some of the projection fields created by the frame elements of the frame, for example front projection field defined by frame elements 1008, 1010, 1019 and one more, or top projection field defined by frame elements 1015, 1019, 1025 and 1020. When looking at different projection fields, each of them may show the hologram 1000 differently, according to the relative location of hologram versus each projection field. For example, top projection fields may show the top portion of the hologram 1000. The hologram may be dynamic and move, for example to the right or left side. The hologram may move rotationally, in the direction of arrow 1005. When the hologram 1000 changes, so is the information projected on each of the projection fields, by the relevant projection units. Frame element 1009 may have a first set of projection units for projecting signals to the front projection field and a second set of projection units for projecting signals to the top projection field.

FIG. 10B shows a frame defining a projection field containing a hologram 1000. The rear projection field 1040 displays content projected by projection units mounted on or contained in at least a portion of the frame elements in the frame, for example rear top frame element 1025, rear right frame element 1002, top right frame element 1020 and other frame elements. The content projected into the rear projection field 1040 may interact with hologram 1000, for example act as a background to the hologram 1000. In some other cases, the rear projection field 1040 may display an object, such as a person, that interacts with the hologram, or that moves responsive to movements of an object in the hologram 1000. The rear projection field 1040 may display a background in at least one projected field, to improve the viewing condition of the hologram. For example, several projected fields may display a black background, to improve the viewing condition of a bright-color hologram. The rear projection field 1040 may display content that interacts with the hologram 1000. For example, in case the hologram shows the earth, the projection field may display the moon 1045 and stars 1048, 1049. The content displayed by the rear projection field 1040 may be selected from a predefined list of objects via a control unit, or by a user of the electronic device that comprises the frame.

FIG. 10C shows a frame defining a projection field containing a hologram 1000 and a sensor unit for sensing an object or a person 1070 in the vicinity of the electronic device. The sensors may detect characteristics of the object or a person 1070. In some cases, the content of the hologram or the direction or orientation of the hologram may change according to the detected person 1070. In some cases, the device may include means to detect the characteristics of such object or a person 1070, and display targeted content to each person.

In some cases, the frame comprises two holograms 1075, 1080 pointing opposite from the person 1070, and their orientation changes towards the person 1070 responsive to detection of the person in the vicinity of the frame. The electronic device may be used in a shopping mall for advertising. The sensors can detect a group of kids to its right, and present a hologram of an ad for a toys shop. Simultaneously, an ad for electronics may be presented on the left side, as the sensor detected a male on the left.

The electronic device of the present invention may comprise at least two hologram-generating devices. Each device may present a shared content, but from a different viewing angle. For example, two players may play a shared game, in which the world globe is an element. One user is in Japan, and the world is hologram in such manner that Japan is in the front. For the other User, who is in New York, the world is hologramed having New York is in the front.

Figure 11:
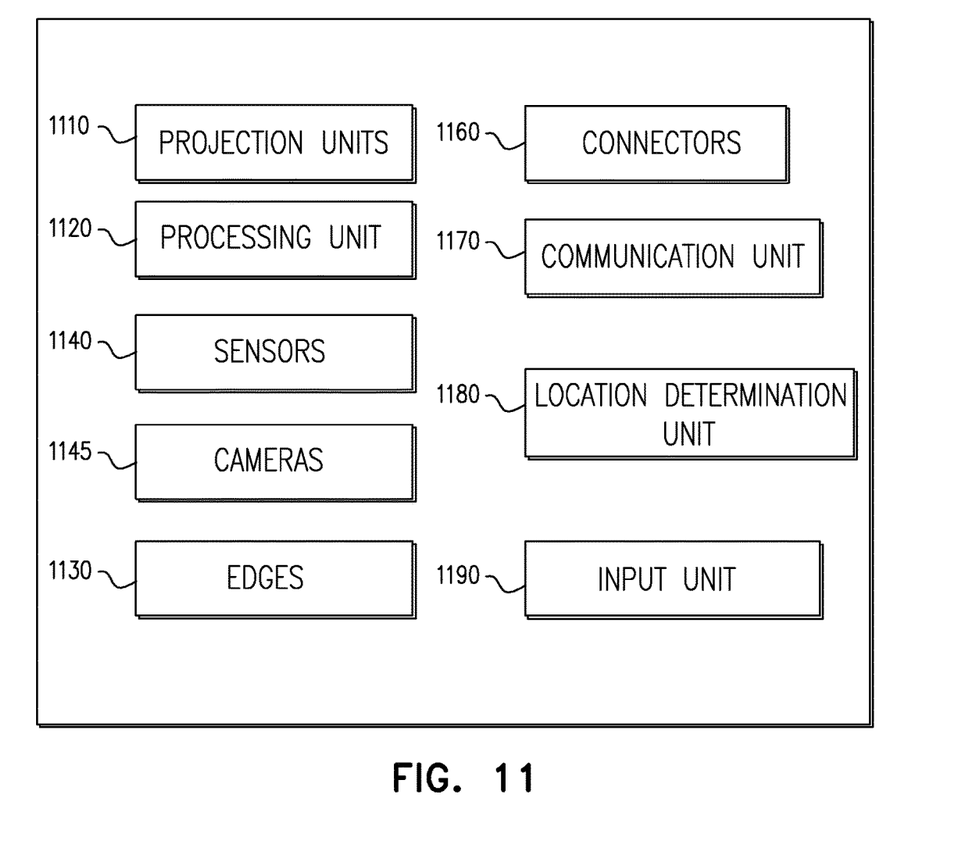

FIG. 11 shows building blocks of the electronic device, in accordance with a preferred embodiment of the invention. The electronic device comprises one or more projection units 1110 configured to project information into the projection field defined by the frame. The projection units 1110 may be controlled by a Processing unit 1120 which determines the content projected by the projection units 1110. The projection units 1110 may project content in grayscale or RGB scale. In some cases, the projection units 1110 are located only in a portion of the circumference of the projection field, for example when one of the frame elements 1130 does not contain a projection unit, or when the projection field is not fully surrounded by the frame. The projection units 1110 may be maneuvered by a mechanical unit, for example when there is a need to project information to an additional projection field, or when there is a need to adjust the content projected.

The processing unit 1120 may be connected to one or more sensors 1140 in order to determine the projected content responsive to the detected information. The sensors 1140 may comprise one or more cameras 1145, or any of the sensor types detailed above. The sensors 1140 may detect the presence of an object inside the projection field or in the vicinity of the electronic device, for example 5 centimeters outside the projection field. The sensors 1140 may detect environmental properties such as temperature, humidity, light, brightness and the like, transmit the environmental properties to the processing unit 1120, which determines that the light projected by the projection units 1110 is adjusted accordingly. The sensors 1140 may detect the position or orientation of the electronic device, such that the content projected by the projection units 1110 may be adjusted accordingly.

The electronic device may also comprise one or more connectors 1160 for connecting portions of the frame, for example frame elements 1130. One connector 1160 may connect two frame elements as shown in FIG. 1, or more frame elements, for example when the frame is of a three-dimensional shape. The connectors 1160 may include bearings, axis, joints and the like.

The electronic device may also comprise a communication unit 1170 for receiving or transmitting signals from or to another electronic device. The communication unit 1170 may receive wireless signals, for example from a satellite to determine the location of the electronic device. The communication unit 1170 may receive signals from another electronic module located inside the projection field. In such a case, the received signals may be sent to the processing unit 1120 in order to determine whether or not they affect the content projected by the projection units 1110. The communication unit 1170 may include a microphone for detecting vocal signals, for example vocal commands from the user of the electronic device, or a speaker in order to emit vocal signals.

The electronic device may also comprise a location determination unit 1180, for example a GPS receiver. The location determination unit 1180 may determine the absolute location of the electronic device, for example via coordinates, or a relative location of the electronic device relative to another device.

The electronic device may also comprise an input unit 1190 for receiving an input. The input may be received from a user of the electronic device, or from another device or object communicating with the electronic device. The input unit 1190 may comprise a button, switch or virtual key used by the user to input commands. In some exemplary cases, the shape of the frame may be adjusted according to the input, or the content projected by the projection units 1110. When changing the shape of the frame, a mechanical element may be sued to move at least a portion of the frame elements 1130. The input unit 1190 may receive commands via a remote control unit, or via another electronic device, or via a communication server such as an email server.

In some cases, a property of the frame is adjusted according to the content displayed in the projecting field. Such property may be size, shape, structure and the like. In some other cases, a display property of the one or more projection units is adjusted according to the content displayed in the projecting field.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An electronic device, comprising:
   a frame comprising one or more projecting units;
   wherein the one or more projecting units are arranged in a manner to project the content on a projecting field, said projecting field is defined by the frame;
   wherein the frame is of a polygonal shape and comprises two or more frame elements, at least two of the two or more frame elements comprise a projection unit of the two or more projection units.

2. The electronic device of claim 1, further comprises a reflector for reflecting content projected from the projecting unit toward the projecting field.

3. The electronic device of claim 1, wherein one frame element of the at least two frame elements comprises more projecting units than another frame element of the at least two frame elements.

4. The electronic device of claim 1, wherein comprising two or more projecting units, wherein one projection unit of the two or more projecting units differs in a display property from another projecting unit of the two or more projecting units.

5. The electronic device of claim 1, wherein the frame is of a two dimensional structure, such that the content can be, displayed on a single projecting field.

6. The electronic device of claim 1, wherein adjusting a display property of the two or more display creation units according to the content displayed in the projecting field.

7. The electronic device of claim 1, further comprises a connector for connecting between frame elements of the frame, such that the frame is collapsible.

8. The electronic device of claim 7, wherein the connector is capable of transferring information from one frame element to another.

9. The electronic device of claim 1, further comprises a sensor for detecting a presence of an object inside or near the projecting field.

10. The electronic device of claim 9, wherein the projecting field receives input from a user according to gestures detected by the sensor on the projecting field.

11. The electronic device of claim 9, wherein the content displayed on the projecting field interacts with the object detected by the sensor.

12. The electronic device of claim 9, wherein the sensor is configured to monitor blood pulse of a user detected in the projecting field.

13. The electronic device of claim 9, wherein selecting the content displayed on the projecting field according to the object detected by the sensor.

14. The electronic device of claim 1, wherein the projected content comprises a hologram.

15. The electronic device of claim 14, wherein the location of the hologram inside the projecting field changes over time.

16. The electronic device of claim 14, wherein comprises a second hologram.

17. The electronic device of claim 1, wherein at least one frame element is structured of two or more collapsible elements in a telescopic arm.

18. The electronic device of claim 17, wherein at least one of the collapsible elements is rotatable versus another collapsible element of the same flame element.

19. An electronic device, comprising:
a frame comprising one or more projecting units;
wherein the one or more projecting units are arranged in a manner to project the content on a projecting field, said projecting field is defined by the frame;
wherein the frame covers less than 360 degrees of the projecting field on which the content is projected.

20. An electronic device, comprising:
a frame comprising one or more projecting units;
wherein the one or more projecting units are arranged in a manner to project the content on a projecting field, said projecting field is defined by the frame;
wherein the frame is of a three dimensional structure, such that the content can be displayed on two or more projecting fields.

21. The electronic device of claim 20, wherein one projecting field of the two or more projecting fields shows a content different from a second content displayed on a second projecting field of the two or more projecting fields.

22. An electronic device, comprising:
a frame comprising one or more projecting units;
wherein the one or more projecting units are arranged in a manner to project the content on a projecting field, said projecting field is defined by the frame;
wherein the frame comprises a flexible display unit.

23. An electronic device, comprising:
a frame comprising one or more projecting units;
wherein the one or more projecting units are arranged in a manner to project the content on a projecting field, said projecting field is defined by the frame;
wherein the frame comprises a storage unit.

24. An electronic device, comprising:
a frame comprising one or more projecting units;
wherein the one or more projecting units are arranged in a manner to project the content on a projecting field, said projecting field is defined by the frame;
wherein projecting field is variable in depth.

25. The electronic device of claim 24, wherein the depth is adjusted in response to a predefined event.

26. An electronic device, comprising:
a frame comprising one or more projecting units;
wherein the one or more projecting units are arranged in a manner to project the content on a projecting field, said projecting field is defined by the frame;
an input unit on the frame for controlling the operation of the projecting units.

27. The electronic device of claim 26, wherein changing a location of a projecting unit according to a command inputted into the input unit.

28. The electronic device of claim 27, wherein changing orientation or configuration of the frame responsive to the command.

29. An electronic device, comprising:
a frame comprising one or more projecting units;
wherein the one or more projecting units are arranged in a manner to project the content on a projecting field, said projecting field is defined by the frame;
wherein adjusting a physical property of the frame according to the content displayed in the projecting field.

* * * * *